United States Patent
Tang et al.

(10) Patent No.: US 10,868,465 B2
(45) Date of Patent: Dec. 15, 2020

(54) LINEAR VIBRATION MOTOR

(71) Applicant: AAC Technologies Pte. Ltd., Singapore (SG)

(72) Inventors: Yun Tang, Shenzhen (CN); Lubin Mao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 5 days.

(21) Appl. No.: 16/527,049

(22) Filed: Jul. 31, 2019

(65) Prior Publication Data

US 2020/0044547 A1 Feb. 6, 2020

(30) Foreign Application Priority Data

Aug. 3, 2018 (CN) ...................... 2018 2 1255398 U

(51) Int. Cl.
*H02K 33/14* (2006.01)
*H02K 33/18* (2006.01)

(52) U.S. Cl.
CPC .................................. *H02K 33/18* (2013.01)

(58) Field of Classification Search
CPC ........ H02K 33/16; H02K 33/18; H02K 33/00; H02K 33/02; H02K 33/12
USPC ......................................... 310/23, 35, 12.16
See application file for complete search history.

(56) References Cited

U.S. PATENT DOCUMENTS

| | | | |
|---|---|---|---|
| 2013/0241322 A1* | 9/2013 | Lee ........................ | B06B 1/045 310/25 |
| 2018/0166961 A1* | 6/2018 | Guo ........................ | H02K 33/18 |
| 2019/0006926 A1* | 1/2019 | Zhu ........................ | H02K 33/02 |

* cited by examiner

*Primary Examiner* — Thanh Lam
(74) *Attorney, Agent, or Firm* — W&G Law Group LLP

(57) ABSTRACT

The present disclosure provides a linear vibration motor. The linear vibration motor includes: a housing and a stator; a vibrator including a mass with a receiving hole and a first driving member disposed in the receiving hole and fixed to the mass; and an elastic support member. The stator includes a fixed member fixed to the housing and passing through the mass via the receiving hole, and a second driving member fixed to the fixed member and spaced apart from the first driving member. One of the first driving member and the second driving member includes a permanent magnet, and the other includes a coil. A first through hole is formed in the top wall. A second through hole is formed in the bottom wall. Two opposite ends of the fixed member in the vibration direction are respectively embedded into the first through hole and the second through hole.

20 Claims, 10 Drawing Sheets

LINEAR VIBRATION MOTOR

TECHNICAL FIELD

The present disclosure relates to the field of vibration motors, and in particular to a linear vibration motor used on a portable consumer electronic product.

BACKGROUND

With development of the electronic technology, portable consumer electronic products, such as mobile phones, hand-held game machines, navigation devices and hand-held multimedia entertainment devices, are becoming more and more popular. In these electronic products, vibration motors are generally used for system feedback, such as call notification of the mobile phone, message notification, navigation notification and vibration feedback of the game machine.

A linear vibration motor in the related art includes a housing with a receiving space, a stator, a vibrator and an elastic support member for supporting the vibrator. The stator, the vibrator and the elastic support member are received in the housing. The vibrator includes a mass with a receiving hole. The stator is inserted into the receiving hole and fixed to the housing. During vibration, the vibrator vibrates in an axis direction of the receiving hole. However, the stator to be fixed takes up the space of the linear vibration motor of this structure. As a result, it is unfavorable for reducing the size of the housing in a vibration direction.

Thus, it is necessary to provide a novel linear vibration motor to solve the above-mentioned problem.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments.

Embodiment 1

Figure 1:
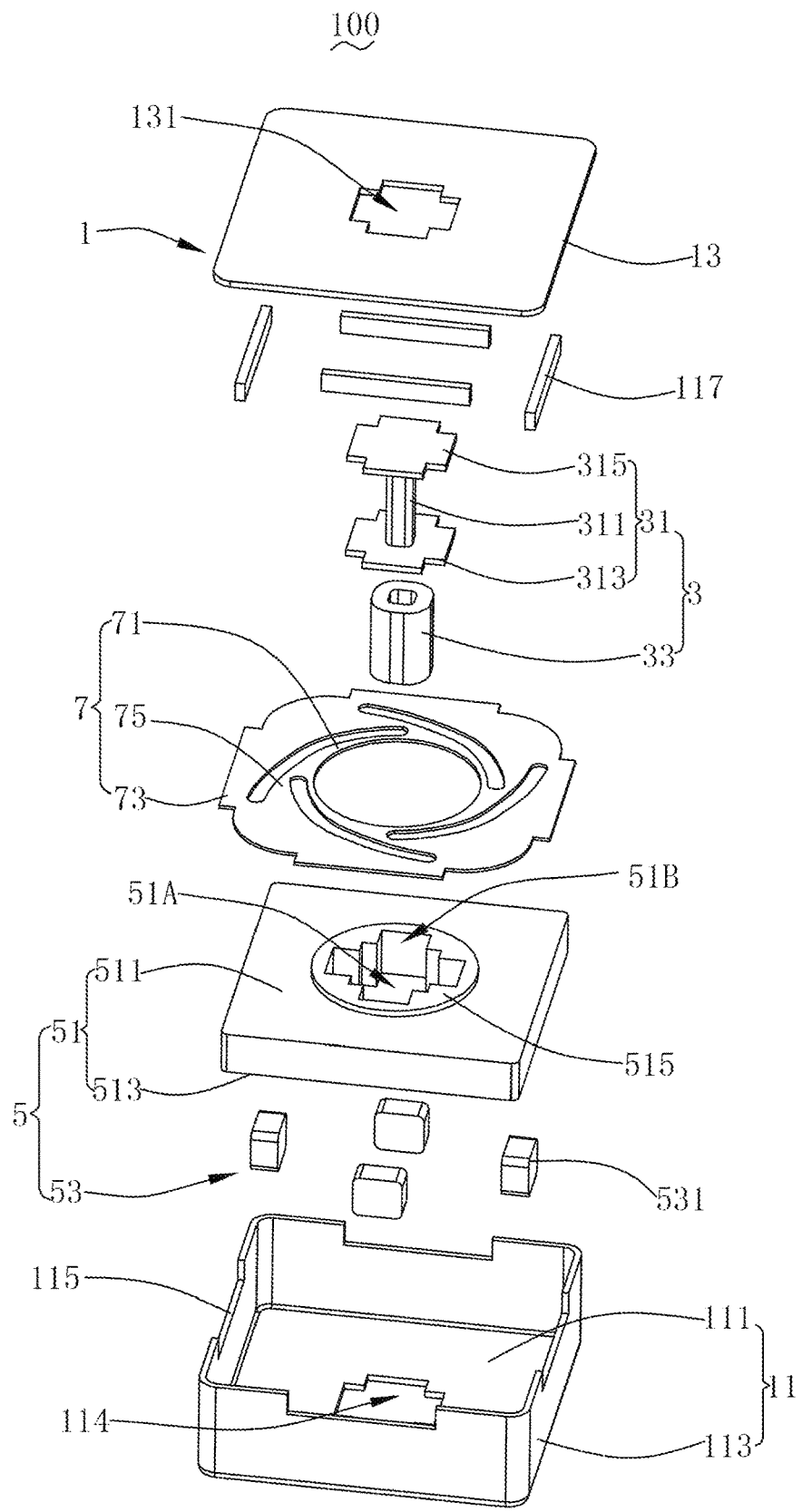
FIG. 1 is a perspective exploded view of a linear vibration motor according to Embodiment 1 of the present disclosure.
Figure 2:
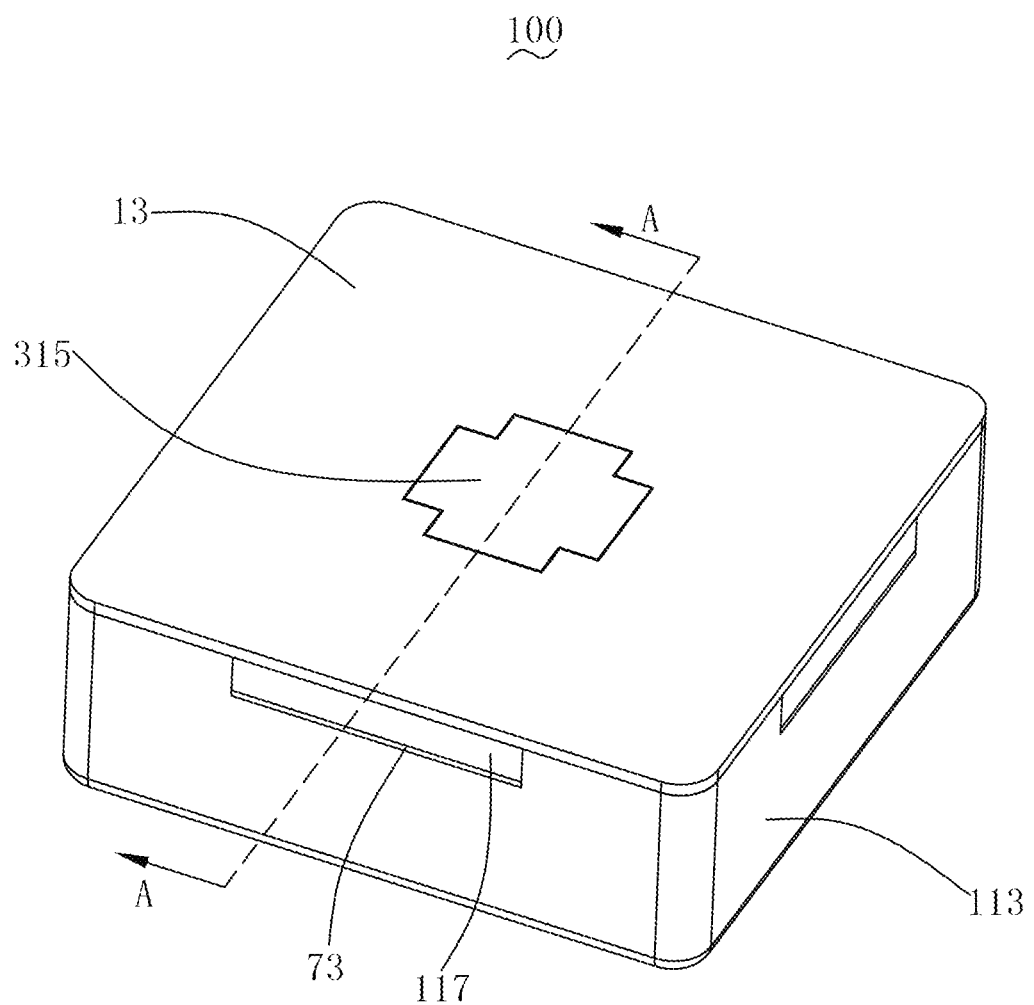
FIG. 2 is a perspective view of the linear vibration motor shown in FIG. 1 after assembly.
Figure 3:
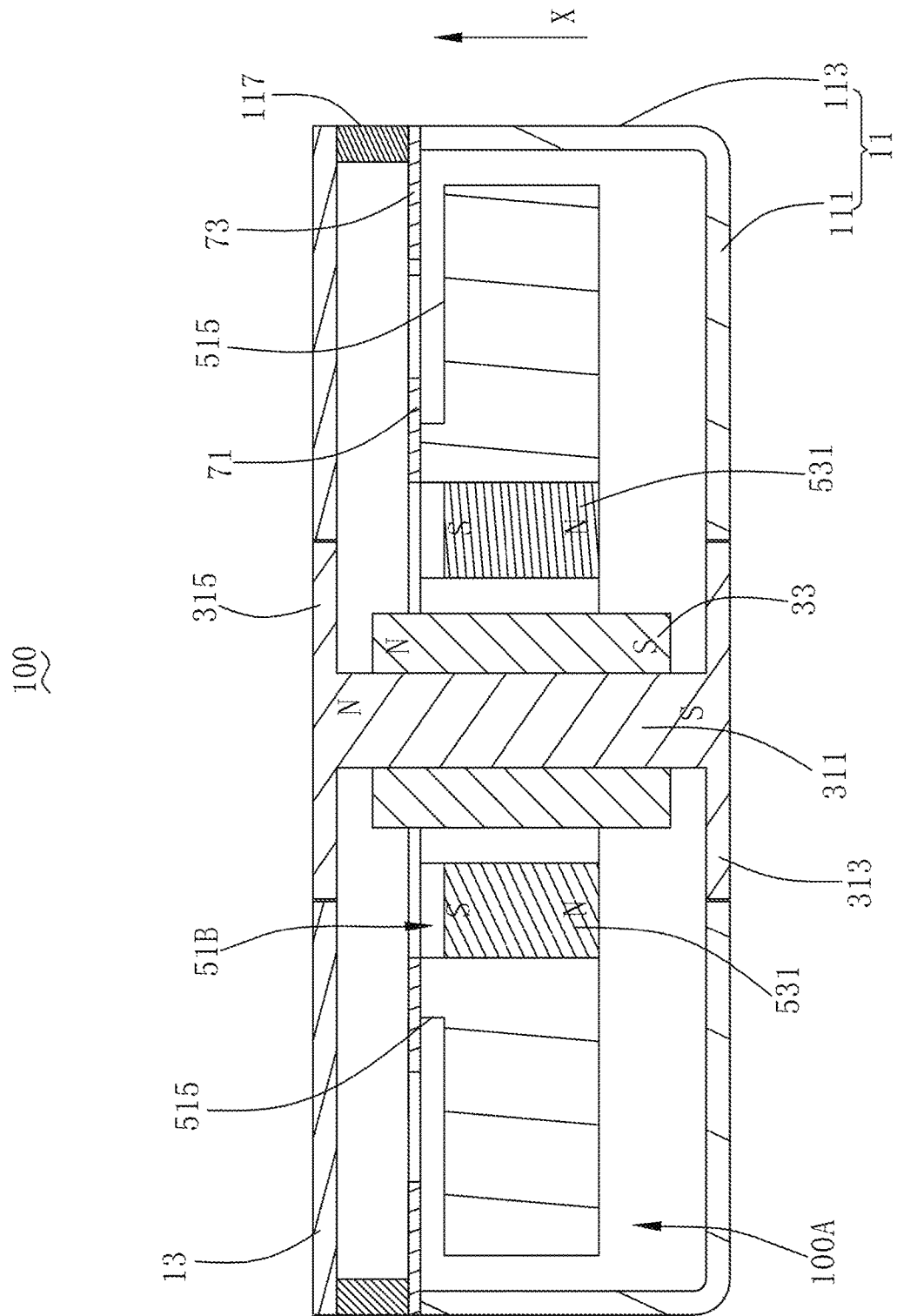
FIG. 3 is a cross-sectional view of the linear vibration motor taken along A-A line shown in FIG. 2.

As shown in FIGS. 1-3, a linear vibration motor 100 includes a housing 1 with a receiving space 100A, as well as a stator 3, a vibrator 5 and an elastic support member 7 for supporting the vibrator 5, which are received in the housing 1. The vibrator 5 vibrates along an axis X (as shown in FIG. 3).

The housing 1 is made of non-permeability magnetic material and includes a shell 11 and a cover plate 13 connected to and covering the shell 11. The shell 11 and the cover plate 13 are enclosed to form the receiving space 100A.

The shell 11 includes a top wall 111 and a side wall 113 extending from the periphery of the top wall 111 in a bent manner. A first through hole 114 is formed in the top wall 111. The side wall 113 is provided with four side edges. A fixing groove 115 is formed in each side edge. A fixed block 117 is disposed in the fixing groove 115. The elastic support member 7 is fixed between a bottom wall of the fixing groove 115 and the fixed block 117, such that the vibrator 5 is suspended in the housing 1. The cover plate 13 is connected to the side wall 113 and the fixed block 117 in a covering manner. It should be understood that the fixed block 117 and the cover plate 13 may be formed into one piece.

The cover plate 13 serves as a bottom wall. A second through hole 131 is formed in the cover plate 13.

The top wall 111 and the cover plate 13 are perpendicular to a vibration direction (namely, the axis X) of the vibrator 5.

The vibrator 5 includes a mass 51 with a receiving hole 51A and a first driving member 53 disposed in the receiving hole 51A and fixed to the mass 51. The receiving hole 51A runs through the mass 51 in the vibration direction (namely, the axis X) of the vibrator 5.

The mass 51 is made from a non-permeability magnetic material and includes a first surface 511 opposite to the top wall 111 and a second surface 513 opposite to the first surface 511. The receiving hole 51A vertically runs through the first surface 511 and the second surface 513. The first surface 511 protrudes towards the top wall 111 to form a boss 515 surrounding the receiving hole 51A.

The first driving member 53 includes at least two permanent magnets 531, which are disposed around and centrosymmetric about an axis of the receiving hole 51A. The permanent magnets 531 may be magnets or magnet steel. The receiving hole 51A takes the shape of a rectangle, a circle or the like.

In this embodiment, the mass 51 is provided with an inner wall enclosing the receiving hole 51A. A mounting groove 51B is formed by recessing from the inner wall along a direction facing away from the stator 3, and the permanent magnet 531 is mounted in the mounting groove. As shown in FIG. 1, the receiving hole 51A is rectangular. Four wall surfaces of the inner wall enclosing the receiving hole 51A are each provided with the mounting groove 51B so that the permanent magnets 531 can be mounted (that is, there are four permanent magnets 531 and four mounting grooves 51B). It should be understood that there may be no mounting groove in the inner wall that encloses the receiving hole 51A, and the permanent magnets 531 are directly fixed to the inner wall that encloses the receiving hole 51A.

The stator 3 includes a fixed member 31 fixed to the housing 1 and running through the mass 51 via the receiving hole 51A, and a second driving member 33 fixed to the fixed member 31 and spaced from the first driving member 53.

Two opposite ends of the fixed member 33 in the vibration direction are respectively embedded into the first through hole 114 and the second through hole 131. The second driving member 33 is a coil wound along the periphery of the fixed member 31. The coil produces a magnetic field opposite to that of the first driving member 53 after being energized. Under the action of the magnetic field produced by the coil, the vibrator 5 vibrates along the axis X.

As shown in FIG. 3, in the first driving member 53, the pole N of the permanent magnet 531 faces the top wall 111, and the pole S thereof faces the cover plate 13; and the pole S of the magnetic field produced after the coil is energized faces the top wall 111, and the pole N thereof faces the cover plate 13. It can be understood that in the first driving member 53, the pole S of the permanent magnet 531 may face the top wall 111 and the pole N thereof may face the cover plate 13; and the pole N of the magnetic field produced after the coil is energized faces the top wall 111, and the pole S thereof faces the cover plate 13. It should be noted that in the two methods above, the coil is wound along the fixed member 31 in opposite directions. That is, the coiling direction of the coil on the fixed member 31 is determined by a polarity direction of the permanent magnet 531 in the first driving member 53.

The fixed member 31 may be made of a non-permeability magnetic material and may also be an iron core. In this embodiment, the fixed member 31 is an iron core. After the coil is energized, the fixed member 31 is magnetized by the magnetic field of the coil. The magnetized fixed member 31 becomes a magnetic body. A magnetic field of the magnetic body and the magnetic field of the coil are superposed to increase a magnetic force of the stator 3.

The fixed member 31 may be columnar and may also be I-shaped. In this embodiment, the fixed member 31 is I-shaped and includes a body portion 311, as well as a first extension portion and a second extension portion which are respectively formed by extending from two ends of the body portion 311. The second driving member 33 is fixed to the body portion 311. The first extension portion 313 is embedded into the first through hole 114. The second extension portion 315 is embedded into the second through hole 131.

In this embodiment, an orthographic projection of the second driving member 33 in the vibration direction on the first extension portion 313 falls within a range of the first extension portion 313. An orthographic projection of the second driving member 33 in the vibration direction on the second extension portion 315 falls within a range of the second extension portion 315. The first extension portion 313 and the first through hole 114 are matched in shape and size, and the second extension portion 315 and the second through hole 131 are matched in shape and size, such that the first extension portion 313 is embedded into the first through hole 114, and the second extension portion 315 is embedded into the second through hole 131. Compared with a columnar fixed member, the I-shaped fixed part can further increase the magnetic force of the stator 3 after being magnetized.

The elastic support member 7 includes a first fixed portion 71 fixed to the mass 51, a second fixed portion 73 fixed to the housing 1 and an elastic connection portion 75 connecting the first fixed portion 71 with the second fixed portion 73. The first fixed portion 71 is fixed to the boss 515 of the mass 51. The second fixed portion 73 is fixed between the bottom wall of the fixing groove 115 and the fixed block 117 to fix the elastic support member 7 to the housing 1. The elastic connection portion 75 and the first surface 511 are spaced from each other.

The first fixed portion 71 may be of a continuous annular structure and may also be of a split structure with all split parts disposed at intervals. In this embodiment, the first fixed portion 71 has a continuous annular structure.

Embodiment 2

Figure 4:
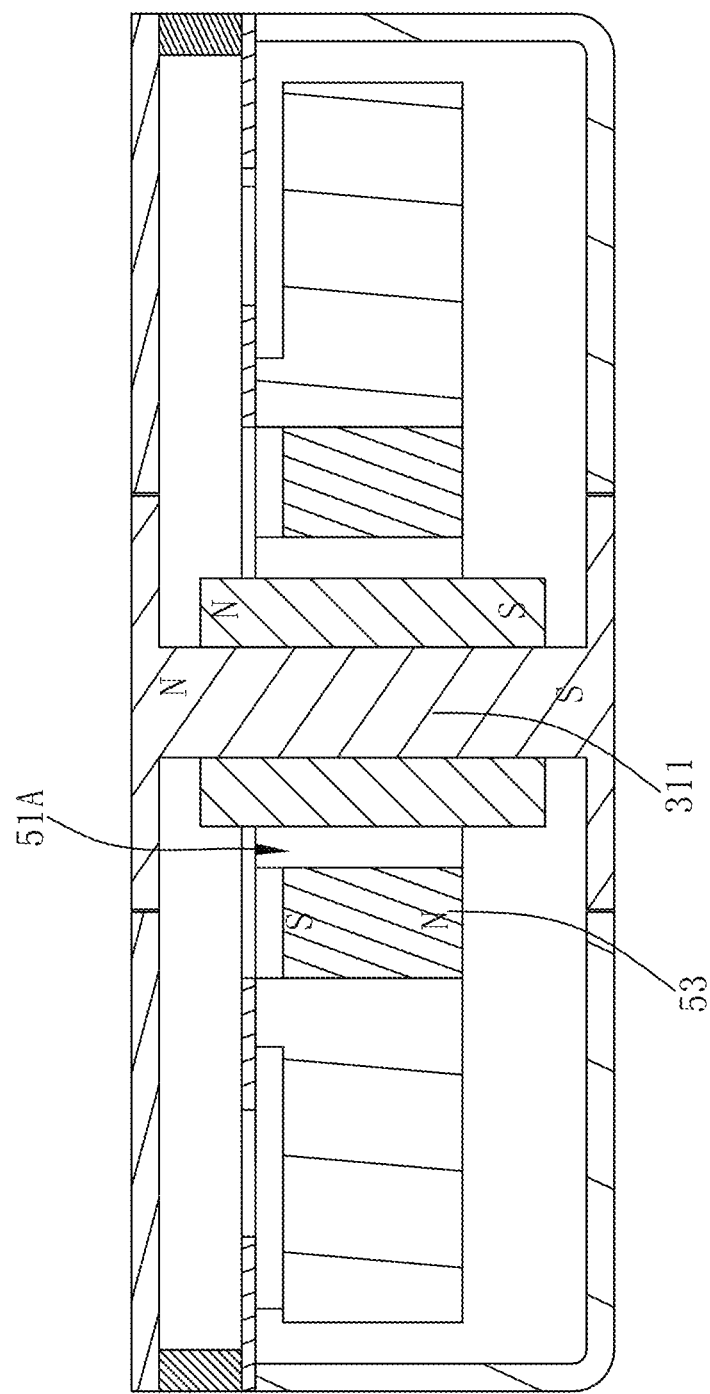
FIG. 4 is a cross-sectional view of a linear vibration motor according to Embodiment 2 of the present disclosure.
Figure 5:
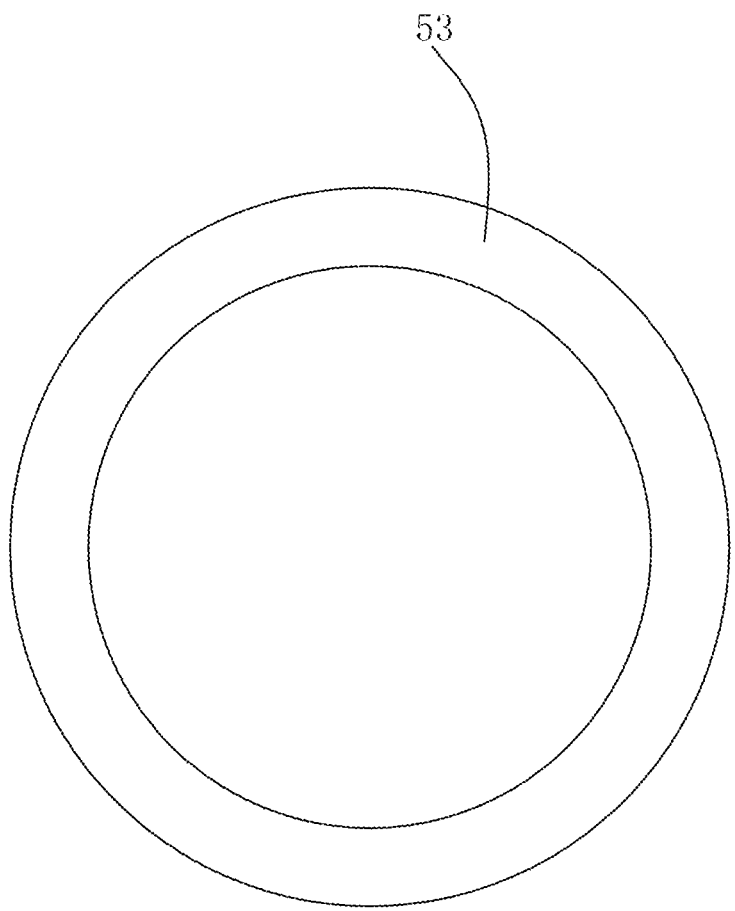
FIG. 5 is a schematic structural view of a first driving member in the linear vibration motor shown in FIG. 4.

With reference to FIGS. 4 and 5, Embodiment 2 differs from Embodiment 1 in that the first driving member 53 is an annular permanent magnet surrounding the fixed member 31, and in particular, the first driving member 53 surrounds the body portion 311 of the fixed member 31. The permanent magnet may be rectangular or circular. Correspondingly, the receiving hole 51 A and the first driving member 53 are matched in shape and size. In this embodiment, the permanent magnet is preferably circular.

Embodiment 3

Figure 6:
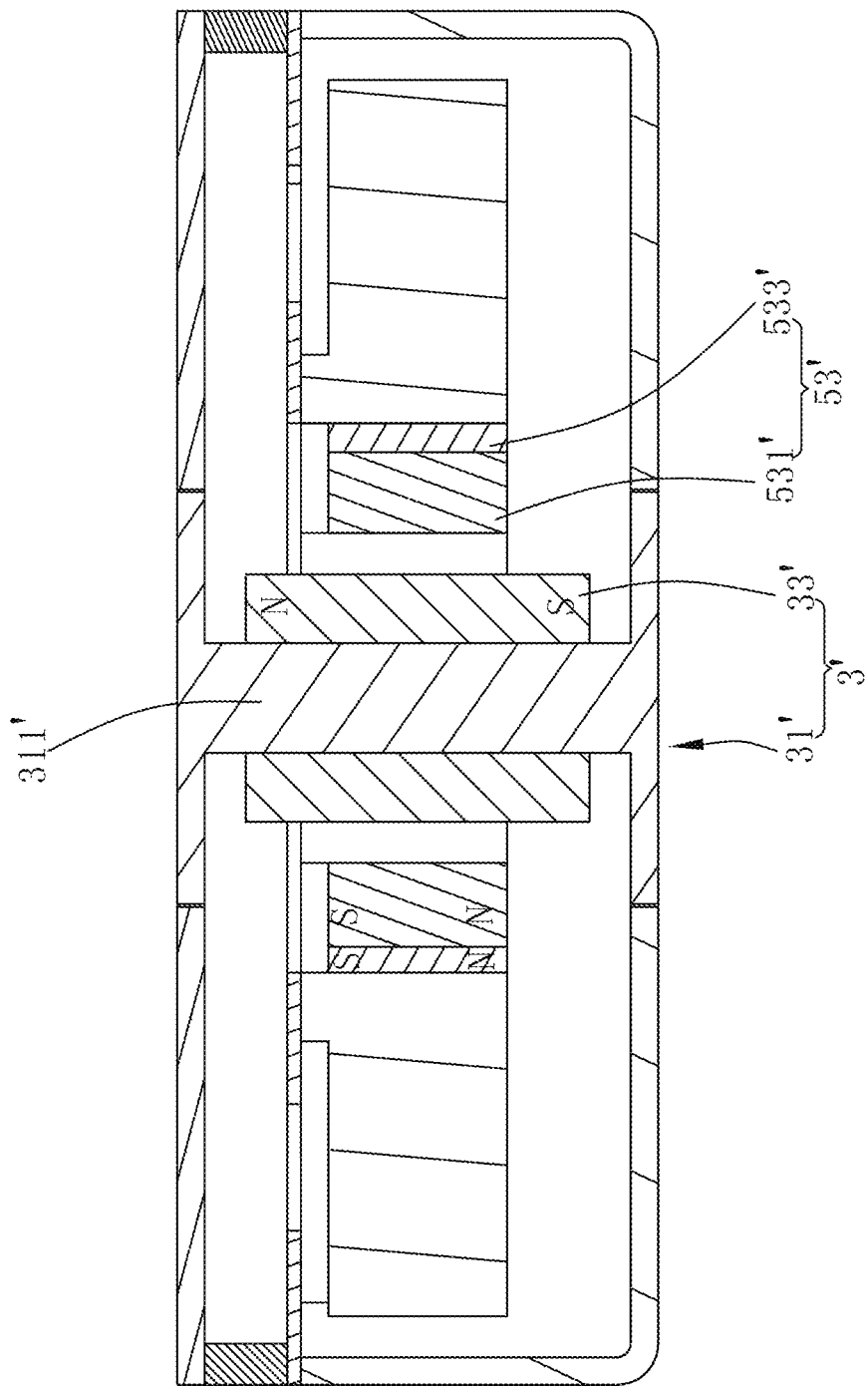
FIG. 6 is a cross-sectional view of a linear vibration motor according to Embodiment 3 of the present disclosure.
Figure 7:
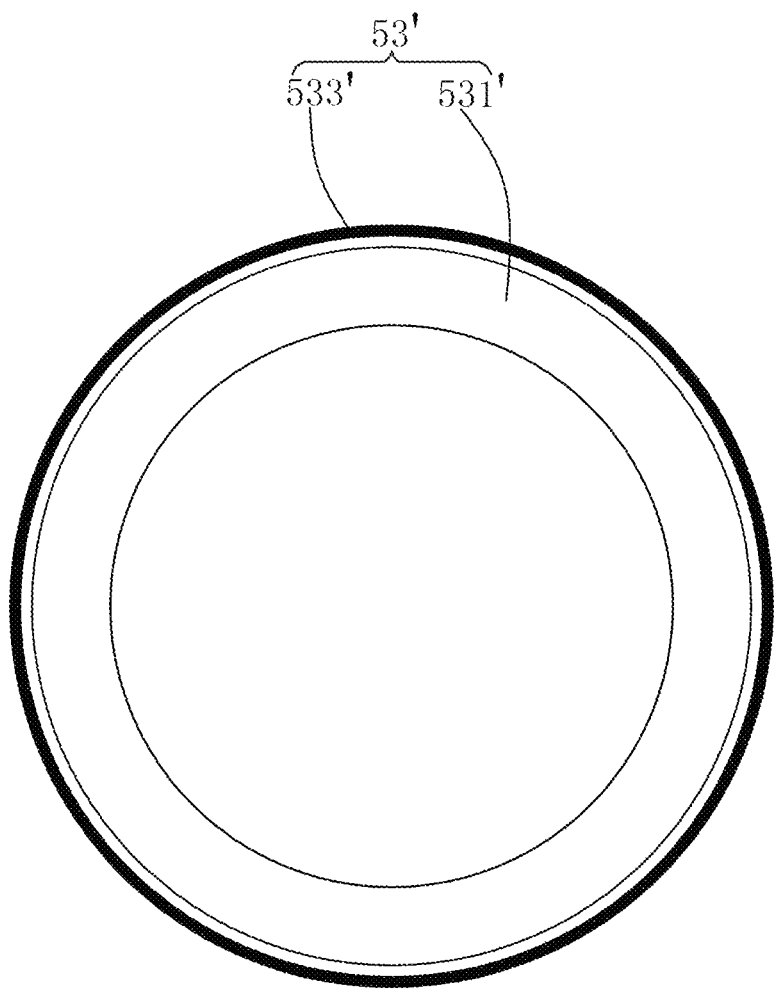
FIG. 7 is a schematic structural view of a first driving member in the linear vibration motor shown in FIG. 6.

With reference to FIGS. 6 and 7, Embodiment 3 differs from Embodiment 1 in that the second driving member 33' is a permanent magnet fixed to the periphery of the fixed member 31', and in particular, the second driving member 33' is fixed to the periphery of the body portion 311' of the fixed member 31'. The first driving member 53' includes an annular support member 531' surrounding the fixed member 31' and a coil 533' wound along the periphery of the support member 531'. The permanent magnet may be a continuous annular permanent magnet and may also be of a split structure with all split parts sequentially disposed around the body portion 311'. The support member 531' may be rectangular or circular. In this embodiment, preferably, the permanent magnet is a continuous annular permanent magnet, and the support member 531' is circular.

The support member 531' may be made of a non-permeability magnetic material or soft iron. In this embodiment, the support member 531' is made of soft iron. After the coil 533' is energized, the support member 531' is magnetized by the magnetic field of the coil 533'. The magnetized support member 531' becomes a magnetic body. A magnetic field of the magnetic body and the magnetic field of the coil 533' are superposed to increase the magnetic force of the first driving member 53'.

The support member 531' may be of an integrated structure or a split structure. When the support member 531' is of a split structure, two adjacent split parts are connected to form an annular structure.

Embodiment 4

Figure 8:
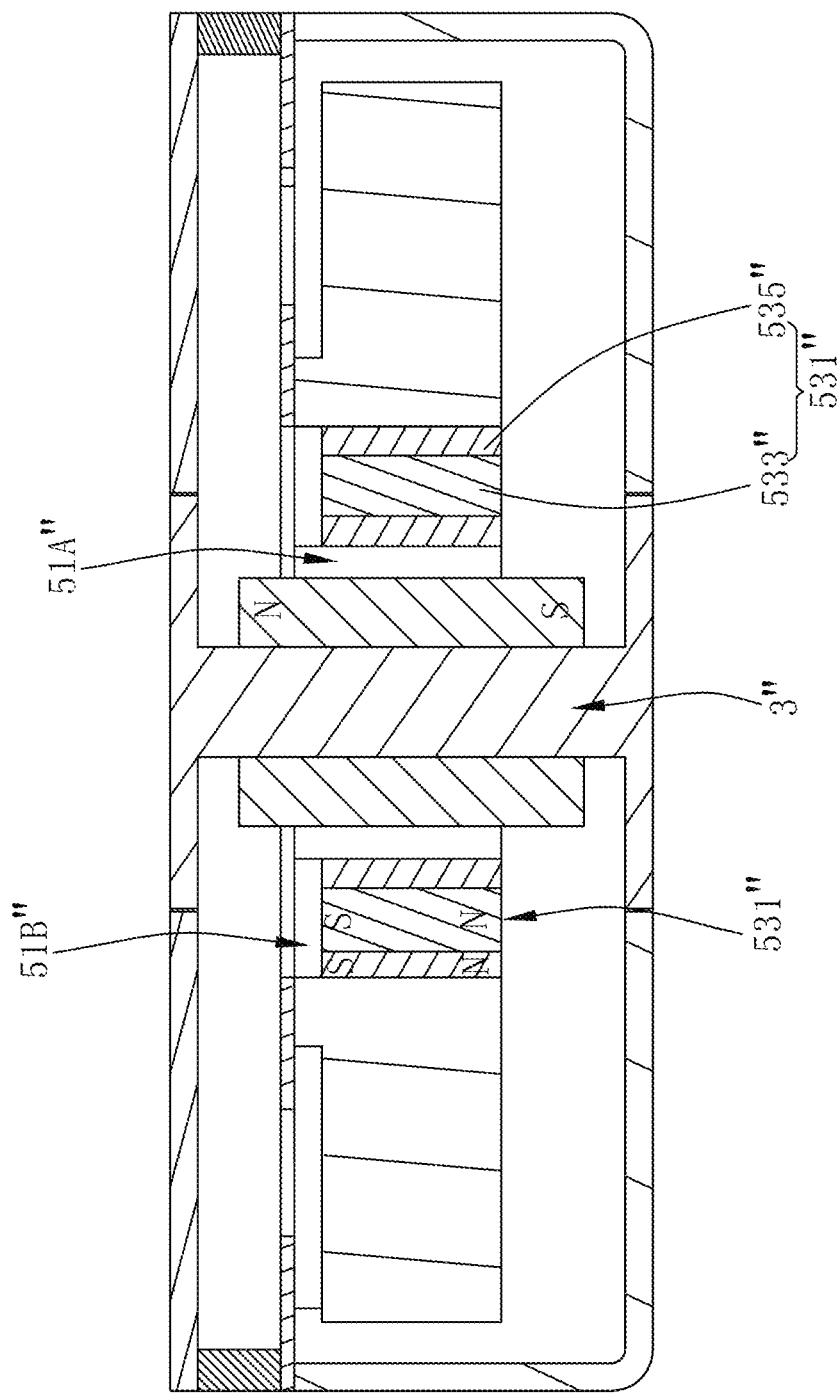
FIG. 8 is a cross-sectional view of a linear vibration motor according to Embodiment 4 of the present disclosure.
Figure 9:
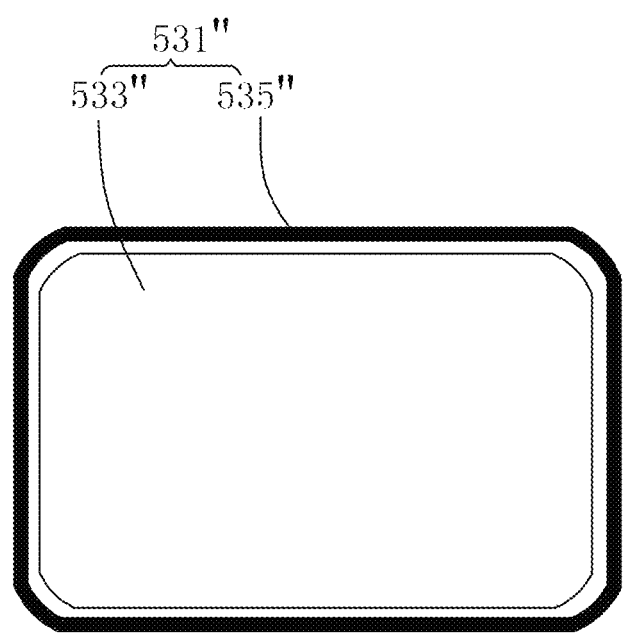
FIG. 9 is a schematic structural view of a first driving member in the linear vibration motor shown in FIG. 8.

With reference to FIG. 8 and FIG. 9, Embodiment 4 differs from Embodiment 3 in that the first driving member includes at least two driving portions 531", each of which includes a core 533" and a coil 535" disposed at the periphery of the core 533". The way in which the driving members 531" are disposed in the receiving hole is the same as the way in which the permanent magnets are disposed in the receiving hole in Embodiment 1. Correspondingly, the structure of the receiving hole is the same as that of the receiving hole in Embodiment 1. That is, the at least two driving portions 531" are disposed around and centrosymmetric about the axis of the receiving hole 51A". A mounting groove 51B", in which the driving portion 531" is mounted, is formed by recessing from an inner wall forming the receiving hole 51A" in a direction facing away from the stator 3".

The core 533" may be made of a non-permeability magnetic material and may also be an iron core. In this embodiment, the core 533" is preferably an iron core. After the coil 535" is energized, the core 533" is magnetized by the magnetic field of the coil 535". The magnetized core 533" becomes a magnetic body. A magnetic field of the magnetic body and the magnetic field of the coil 535" are superposed to increase the magnetic force of the first driving member 53".

Embodiment 5

Figure 10:
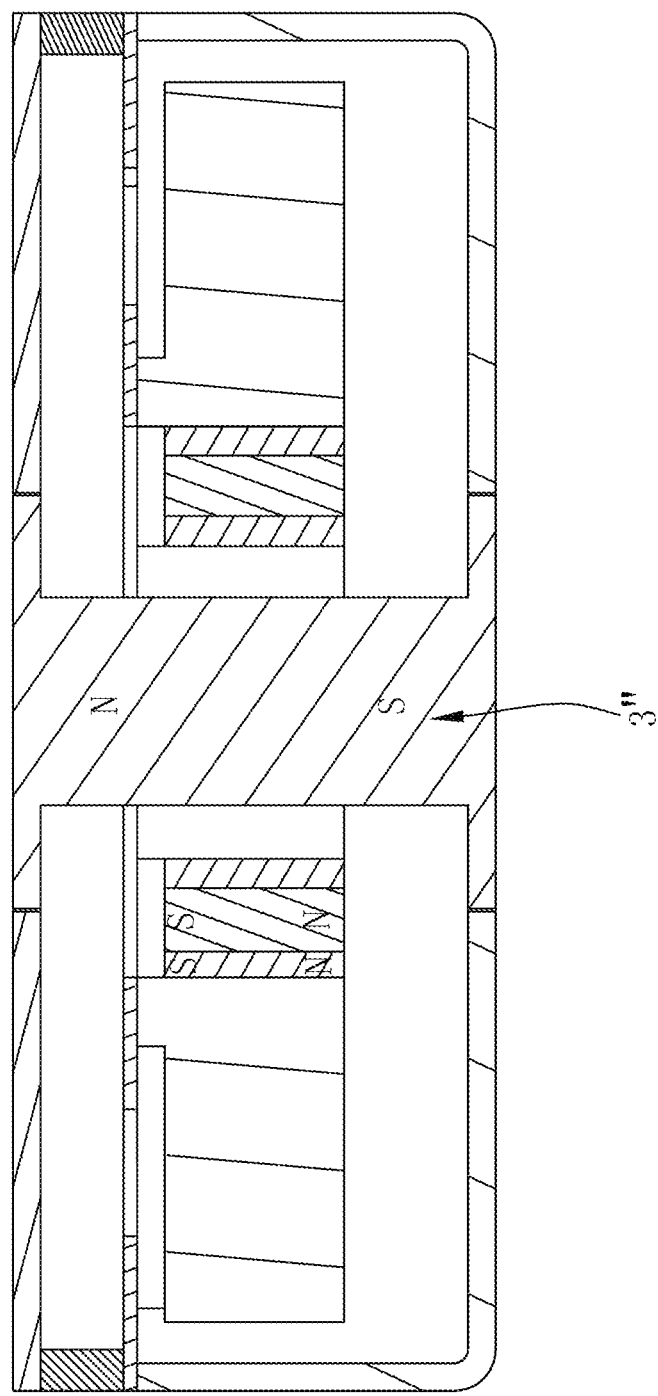
FIG. 10 is a cross-sectional view of a linear vibration motor according to Embodiment 5 of the present disclosure.

With reference to FIG. 10, Embodiment 5 differs from Embodiment 3 or Embodiment 4 in that the fixed member is a permanent magnet, and the fixed member and the second driving member are formed into one piece. That is, the stator 3 is I-shaped.

According to the linear vibration motor provided by the present disclosure, as the two ends of the stator are respectively embedded into the first through hole in the top wall and the second through hole in the bottom wall, the internal space of the linear vibration motor can be saved to reduce its height.

The above descriptions are only preferred embodiments of the present disclosure. It should be noted here that improvements that may be made by those of ordinary skill in the art without departing from the inventive concept of the present disclosure should fall within the scope of protection of the present disclosure.

The invention claimed is:

1. A linear vibration motor, comprising:
a housing with a receiving space;
a stator;
a vibrator; and
an elastic support member for supporting the vibrator, wherein the stator, the vibrator and the elastic support member are received in the housing,
the vibrator comprises a mass with a receiving hole and a first driving member disposed in the receiving hole and fixed to the mass, and the receiving hole passes through the mass in a vibration direction of the vibrator,
the stator comprises a fixed member fixed to the housing and passing through the mass via the receiving hole, and a second driving member fixed to the fixed member and spaced apart from the first driving member; one of the first driving member and the second driving member comprises a permanent magnet, the other one of the first driving member and the second driving member comprises a coil, and the vibrator vibrates in the vibration direction after the coil is energized,
the housing is provided with a top wall and a bottom wall that are opposite to each other in the vibration direction, a first through hole is formed in the top wall, a second through hole is formed in the bottom wall, and two opposite ends of the fixed member in the vibration direction are respectively embedded into the first through hole and the second through hole.

2. The linear vibration motor as described in claim 1, wherein the fixed member comprises a body portion, and a first extension portion and a second extension portion which are respectively formed by extending from two ends of the body portion, the second driving member is fixed to the body portion, the first extension portion is embedded into the first through hole, and the second extension portion is embedded into the second through hole.

3. The linear vibration motor as described in claim 2, wherein an orthographic projection of the second driving member in the vibration direction on the first extension portion falls within a range of the first extension portion, and an orthographic projection of the second driving member in the vibration direction on the second extension portion falls within a range of the second extension portion.

4. The linear vibration motor as described in claim 1, wherein the second driving member is a coil wound along a periphery of the fixed member.

5. The linear vibration motor as described in claim 2, wherein the second driving member is a coil wound along a periphery of the fixed member.

6. The linear vibration motor as described in claim 4, wherein the fixed member is an iron core.

7. The linear vibration motor as described in claim 4, wherein the first driving member comprises at least two permanent magnets, which are disposed around and centrosymmetric about an axis of the receiving hole.

8. The linear vibration motor as described in claim 7, wherein the mass is provided with an inner wall forming the receiving hole, and a mounting groove is formed by recessing from the inner wall in a direction facing away from the stator, the permanent magnet being mounted in the mounting groove.

9. The linear vibration motor as described in claim 4, wherein the first driving member is an annular permanent magnet surrounding the fixed member.

10. The linear vibration motor as described in claim 1, wherein the second driving member is a permanent magnet fixed to a periphery of the fixed member.

11. The linear vibration motor as described in claim 2, wherein the second driving member is a permanent magnet fixed to a periphery of the fixed member.

12. The linear vibration motor as described in claim 10, wherein the fixed member is a permanent magnet, and the fixed member and the second driving member are formed into one piece.

13. The linear vibration motor as described in claim 10, wherein the first driving member comprises an annular support member surrounding the fixed member and a coil wound around a periphery of the support member.

14. The linear vibration motor as described in claim 13, wherein the support member is made of soft iron.

15. The linear vibration motor as described in claim 10, wherein the first driving member comprises at least two driving portions, the at least two driving portions being disposed around and centrosymmetric about an axis of the receiving hole, and the driving portion comprising a core and a coil disposed at a periphery of the core.

16. The linear vibration motor as described in claim 15, wherein the core is an iron core.

17. The linear vibration motor as described in claim 15, wherein the mass is provided with an inner wall enclosing the receiving hole, and a mounting groove is formed by recessing from the inner wall in a direction facing away from the stator, the driving portion being mounted in the mounting groove.

18. The linear vibration motor as described in claim 1, wherein the elastic support member comprises a first fixed portion fixed to the mass, a second fixed portion fixed to the housing, and an elastic connection portion connected the first fixed portion with the second fixed portion.

19. The linear vibration motor as described in claim 18, wherein the mass comprises a first surface opposite to the bottom wall and a second surface opposite to the first surface, the receiving hole vertically passes through the first surface and the second surface, the first surface protrudes towards the bottom wall to form a boss surrounding the receiving hole, the first fixed portion is fixed to the boss, and the elastic connection portion and the first surface are spaced from each other.

20. The linear vibration motor as described in claim 19, wherein the first fixed portion has a continuous annular structure.

* * * * *